US010253620B1

(12) United States Patent
Rose et al.

(10) Patent No.: US 10,253,620 B1
(45) Date of Patent: Apr. 9, 2019

(54) SYSTEM FOR KICK DETECTION DURING A DRILLING OPERATION

(71) Applicants: Kelly K. Rose, Albany, OR (US); Brian C. Tost, Albany, OR (US); Fred Aminzadeh, Woodland Hills, CA (US)

(72) Inventors: Kelly K. Rose, Albany, OR (US); Brian C. Tost, Albany, OR (US); Fred Aminzadeh, Woodland Hills, CA (US)

( * ) Notice: Subject to any disclaimer, the term of this patent is extended or adjusted under 35 U.S.C. 154(b) by 0 days.

(21) Appl. No.: 14/852,845

(22) Filed: Sep. 14, 2015

Related U.S. Application Data

(60) Provisional application No. 62/053,832, filed on Sep. 23, 2014, provisional application No. 62/164,609, filed on May 21, 2015.

(51) Int. Cl.
E21B 47/10 (2012.01)
E21B 47/12 (2012.01)
E21B 47/14 (2006.01)
E21B 47/00 (2012.01)
E21B 47/01 (2012.01)
(Continued)

(52) U.S. Cl.
CPC ............ E21B 47/102 (2013.01); E21B 47/00 (2013.01); E21B 47/01 (2013.01); E21B 47/101 (2013.01); E21B 47/122 (2013.01); E21B 47/14 (2013.01); G01V 1/48 (2013.01); G01V 3/30 (2013.01);
(Continued)

(58) Field of Classification Search
CPC .... E21B 47/102; E21B 47/101; E21B 47/122; E21B 47/14; E21B 47/00; E21B 47/01; G01V 1/48; G01V 3/30; G01V 5/10; G01V 5/125; G01V 11/00
See application file for complete search history.

(56) References Cited

U.S. PATENT DOCUMENTS 5,091,644 A 2/1992 Minette
5,250,806 A 10/1993 Rhein-Knudsen et al.
(Continued)

OTHER PUBLICATIONS

Bryant, T. M., & Wallace, S. N. (Jan. 1, 1991). Field Results of an MWD Acoustic Gas Influx Detection Technique. Society of Petroleum Engineers. doi:10.2118/21963-MS.
(Continued)

Primary Examiner — Mohamed Barakat
(74) Attorney, Agent, or Firm — Timothy L. Harney; Daniel D. Park; Brian J. Lally

(57) ABSTRACT

The disclosure provides a kick detection system for use during a drilling operation where wellbore kick warnings are provided based on indications of standoff conditions in a compensated instrument system. The system provides a warning of a potential kick condition by analyzing a current instrument compensation against a time series of past compensations, in order to monitor whether conditions within the standoff region of the wellbore are unexpectedly changing. The system comprises a source, a short-spaced detector, and a long-spaced detector, and a processor receives the short-spaced signal and the long-spaced signal, compensates the long-spaced signal, and generates standoff data reflecting the corrections applied to the long-range signal. The processor determines and maintains the standoff data as a time series and periodically compares a recent data point to a moving average in order to evaluate indications of a potential well kick.

14 Claims, 3 Drawing Sheets

(51) Int. Cl.
   *G01V 5/12*     (2006.01)
   *G01V 5/10*     (2006.01)
   *G01V 3/30*     (2006.01)
   *G01V 1/48*     (2006.01)
   *G01V 11/00*    (2006.01)

(52) U.S. Cl.
   CPC ............ *G01V 5/10* (2013.01); *G01V 5/125* (2013.01); *G01V 11/00* (2013.01)

(56) References Cited

U.S. PATENT DOCUMENTS

| | | |
|---|---|---|
| 6,768,106 B2 | 7/2004 | Gzara et al. |
| 7,284,605 B2 | 10/2007 | Clark et al. |
| 7,587,936 B2 | 9/2009 | Han |
| 8,547,789 B2 | 10/2013 | Wu et al. |
| 9,291,049 B2 * | 3/2016 | Switzer .................. E21B 47/122 |
| 2004/0200274 A1 * | 10/2004 | Moake .................... G01V 5/125 73/152.05 |
| 2007/0112521 A1 * | 5/2007 | Akimov .................. G01V 11/00 702/6 |
| 2012/0126809 A1 * | 5/2012 | Hopper .............. G01R 33/3808 324/303 |
| 2015/0142320 A1 * | 5/2015 | Wu .......................... G01V 3/38 702/11 |
| 2015/0192773 A1 * | 7/2015 | Perkins .................. G01J 1/0295 250/269.1 |

OTHER PUBLICATIONS

Meen-Wah Gui, "The Basics of Noise Detection and Filtering for Borehole Drilling Data," The Open Civil Engineering Journal, 2 (2008).

* cited by examiner

SYSTEM FOR KICK DETECTION DURING A DRILLING OPERATION

RELATION TO OTHER APPLICATIONS

This patent application claims priority from provisional patent application 62/053,832 filed Sep. 23, 2014 and provisional patent application 62/164,609 filed May 21, 2015 which are hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments of the present invention relates to a system for the detection of formation fluid influxes (a/k/a "kick") into the wellbore (a/k/a the borehole) during a drilling operation using corrections generated by at least one of the short and/or medium-ranged sensors comprising a down-hole compensated instrument.

BACKGROUND

Onshore and offshore hydrocarbon development increasingly targets deep reservoirs. During drilling, a variety of pressure, temperature, and pore-filling fluid regimes can be encountered. Kick and loss-of-well control events during drilling represent risks to personnel, infrastructure, the environment, and the economics of the well. Maintaining well control in the borehole requires appropriate use of over-balanced and underbalanced drilling techniques. Maintaining the proper balance between mud weight—the primary tool for controlling this balance between the borehole and the surrounding formation and pore-filling fluids—is a significant challenge.

The invention of while-drilling technologies and sensors have been instrumental in the measurement, monitoring, characterization, and communication of borehole, near-borehole, and far-borehole environments in real-time. The principal while-drilling technologies are referred to as: Logging-While-Drilling (LWD) and Measurement-While-Drilling (MWD). LWD is generally used to describe instrumentation for the measurement of formation rock and fluid properties, such as electrical resistivity and bulk density. MWD is used to describe instrumentation that provides data related to drilling mechanics, wellbore deviation, directional surveys, and data transmission to the surface in real-time. In both MWD and LWD, the tools are incorporated into the drill string and are located in drill collars near the drill bit. These technologies provide feedback as the well is drilled, and have effected better decision making for engineers during the drilling process in order to improve safety, reduce costs, and enhance efficiency.

Most drilling activities for oil and gas are carried out using over-balanced drilling where the drilling fluid's pressure is maintained above the formation's pore pressure. Despite industry best practices and the use of sophisticated technology, the drilling fluid's pressure may fall below the formation pressure and result in the influx of formation fluid into the wellbore during drilling or a "kick". Basic methods of kick detection currently in-use include mud logging, where drilling operations rely on mud returns to the rig floor to identify when a well being drilled is taking on a kick of liquid hydrocarbons, gas, or water from the surrounding subsurface formation. Acoustic methods have also been utilized, which involve generating pressure waves in the drilling mud, and monitoring travel times to determine if the drilling mud is diluted by dissolved gas (a/k/a "gas-cut").

In some conventional LWD/MWD tools (e.g. gamma or neutron density, acoustic velocity, electrode or ring electrical resistivity, and electromagnetic induction), a source transmits a measurement medium (e.g. energy or neutrons) into the wellbore and surrounding geologic formation. The measurement medium interacts with the material in the standoff (e.g. drilling fluid and drill cuttings); materials which can transmit or attenuate the measurement medium. Measurement medium attenuation occurs by deflecting the measurement medium backward to the source (a/k/a back-scatter). The back-scatter because of standoff attenuation is detected by the instrumentation sensors, and signals from multiple sensors are analyzed in order to provide a compensated measurement reflecting a property of the geologic formation. The compensation involves the use of multiple detectors at different spacings from the instrumentation source, and is achieved because the lateral depth-of-investigation by geophysical instrumentation into a geologic formation is primarily dependent on the source-receiver spacing. As the source-receiver spacing increases, the subsurface volume comprised of both the standoff and the geologic formation that is investigated by the geophysical instrumentation also increases. The increase in investigated volume means the geophysical instrumentation has a greater lateral depth-of-investigation into the geologic formation. Once the investigated borehole volume extends beyond the wellbore standoff and into the geologic formation, it is then possible to account for the standoff effect within the formation measurement, which allows isolation of the geologic formation measurements.

To date, LWD and MWD data has focused on evaluation and analysis of the geologic formation and pore-filling fluids in the near-wellbore environment. Information related to the standoff fluids has typically been treated like noise and filtered out. This disclosure focuses on the standoff background data (a/k/a "noise") for use as early indicators of changes in the composition and physical properties of the borehole-filling fluids (e.g. the drilling mud, formation fluids, and associated formation cuttings) that are indicative of an influx of water, gas or liquid hydrocarbons from the surrounding geologic formation. Early kick detection can be obtained by using the principals of wellbore geophysics with advanced modeling techniques, and existing borehole geophysical data to monitoring real-time changes in the physical properties (electrical resistivity or conductivity, compressional (p-wave) velocity, and bulk density) of the drilling mud in the standoff near the bit.

These and other objects, aspects, and advantages of the present disclosure will become better understood with reference to the accompanying description and claims.

SUMMARY

The disclosure provides a kick detection system for use during a drilling operation where wellbore kick warnings are provided based on indications of standoff conditions in a compensated instrument system. The system provides a warning of a potential kick condition by analyzing a current instrument compensation against a time series of past compensations, in order to monitor whether conditions within the standoff region of the wellbore are unexpectedly changing.

The system operates in a fluid-filled wellbore generated by a drilling operation and comprises a compensated instrument system comprising a source, at least one short-spaced detector, and at least one long-spaced detector. The source emits energy into the wellbore and surrounding geologic formation and the detectors generate a short and long-spaced signal. The source may emit any form of measurement medium into both the wellbore and the surrounding geologic formation. The measurement medium may be composed of energy (e.g. gamma rays, acoustic energy, or an electromagnetic waves) or particles (e.g. neutrons). A processor in data communication with the compensated instrument system receives the short-spaced signal and the long-spaced signal and compensates the long-spaced signal in order to provide an indication of a physical property with the geologic formation, such as density, porosity, or some other property. During this process, the processor also generates standoff data reflecting the corrections applied to the long-range signal. The processor determines and maintains the standoff data as a time series comprising successive data point determinations made over a time interval, typically determined by the frequency at which compensated instrument system communicates with the processor, and selects typically the most recent data point to a moving average. If the data point is within established thresholds generally based on the drilling mud properties known by the well operator, the data point is utilized to update the moving average for the next time period. However, if the data point, falls outside established thresholds, the processor generates a warning signal and transmits the warning signal to a display, to indicate that a well kick may be occurring.

In a particular embodiment, the system comprises a plurality of compensated instrument systems where each compensated instrument system provides a long-spaced signal and a short-spaced signal to the processor. In this embodiment, for each individual group of long and short-spaced signals received, the processor conducts a similar evaluation using standoff data specific to an individual compensated instrument system. In this embodiment, the processor may communicate the warning signal to the display based on the standoff data generated from a single compensated instrument system, or may apply a criteria, such as requiring at least 2 of 3 compensated instrument systems to generate standoff data outside the moving average thresholds before providing a warning signal to the display.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a system for the detection of a well kick using a compensated instrument system.

The disclosure provides a kick detection system for use during a drilling operation where wellbore kick warnings are provided based on indications of standoff conditions in a compensated instrument system. The disclosure focuses on the wellbore "noise" data to evaluate changes in the composition and physical properties of the borehole filling fluids (e.g. drilling mud and associated cuttings) to indicate possible kicks because of an influx of water, gas or liquid hydrocarbon from the surrounding geologic formation. The disclosure provides a warning of a potential kick condition by comparing corrections utilized to provide a compensated measurement to the moving average of a time series of previously utilized corrections, in order to monitor whether conditions within the standoff region of the wellbore are unexpectedly changing. The moving average provides time forecasting of the previously utilized corrections, and a necessary correction which falls outside established thresholds around the moving average serves as an indication of changing conditions within the standoff region between the drilling mechanism and the wellbore wall.

Figure 1:
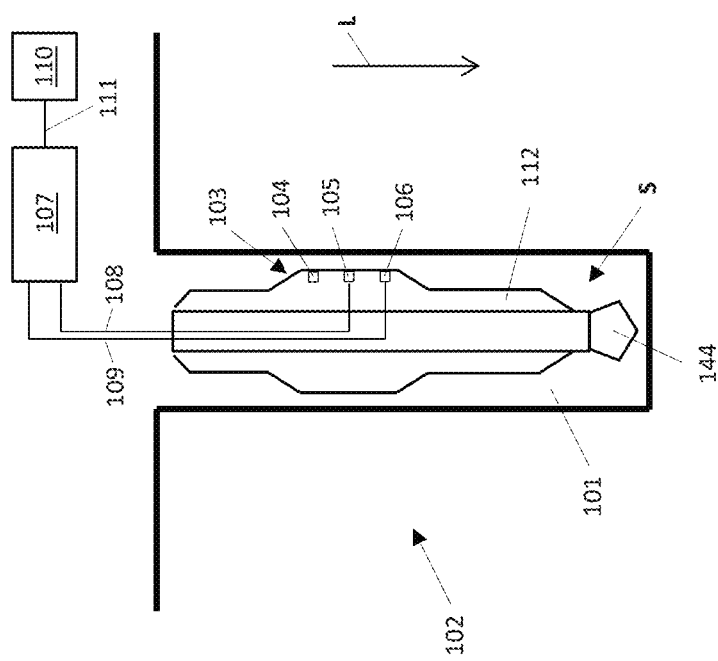
FIG. 1 illustrates an embodiment of the system for kick detection.

An embodiment of the kick detection system is shown at FIG. 1. FIG. 1 illustrates a wellbore 101 generated by a drilling operation and within geologic formation 102. The system comprises a compensated instrument system 103 generally disposed on a tool collar 112 within wellbore 101 and comprising a source 104, a short-spaced detector 105, and a long-spaced detector 106. Source 104 emits energy into wellbore 101 and geologic formation 102, and short-spaced detector 105 and long-spaced detector 106 detect the energy transmitted and generate a short-spaced signal and a long-spaced signal, respectively. Short-spaced detector 105 and long-spaced detector 106 are displaced from source 104 in a direction for example the direction indicated by L, and the displacement between short-spaced detector 105 and source 104 is less than the displacement between long-spaced detector 106 and source 104. Processor 107 is in data communication with compensated instrument system 103 at for example 108 and 109, and receives the short-spaced signal and the long-spaced signal from short-spaced detector 105 and long-spaced detector 106 respectively. Processor 107 compensates the long-spaced signal using the short-spaced signal in order to provide an indication of a physical property of geologic formation 102, such as density, porosity, or some other property. Processor 107 may receive the short-spaced signal and long-spaced signal from short-spaced detector 105 and long-spaced detector 106 respectively using means known in the art, for example, mud pulse telemetry, electromagnetic frequency communication, or via a wired drill pipe. As illustrated, the system typically operates in wellbore 101 in the presence of a standoff S, where S indicates a generally annular volume between the drill bit 144 and the walls of wellbore 101.

Such compensated instrument systems are known in the art. For example, formation density may be indirectly measured using a gamma density method where source 104 is a gamma ray source and short-spaced detector 105 and long-spaced detector 106 detect back-scattering. Gamma rays are emitted radially from the tool in the borehole towards the borehole wall, and a minority portion of the emitted gamma rays are back-scattered by the materials in the standoff (e.g. drilling and formation fluids, or formation cuttings). The short-spacing detector receives the standoff back-scatter, which is used to correct the long-spacing detector for any standoff interference. The gamma rays that reach the borehole wall either pass through the borehole wall or are back-scattered by the formation materials (i.e. solids, liquids, or gases) composing the borehole wall. The distance between each detector and the source roughly determines the average distance into the formation a gamma ray travels before it is scattered back to the detector. The difference in density is output as a curve on a log and that is generally referred to as a density correction, and is used to correct the measurement so the output for the tool is actually derived from both detectors. In these systems, generally the correction is utilized to provide a reading reflecting the true density of the geologic formation. Other compensated energy systems monitor the geologic formation by emitting electric currents into the formation and determining an electrical property, such as resistivity or conductivity using multiple detectors, or by emitting acoustic waves with reception at multiple detectors. In these compensated systems, compensation is achieved because the lateral depth-of-investigation by geophysical instrumentation into a geologic formation is primarily dependent on the source-receiver spacing. As the source-receiver spacing increases, the borehole volume which is investigated by the geophysical instruments also increases. The increase in investigated volume means a greater lateral depth-of-investigation into the geologic formation. Once the investigated borehole volume extends beyond the standoff and into the geologic formation, it is then possible to subtract the annular effect from the total measurement, which assists in isolating the geologic formation measurements. See e.g., Kennedy, M., *Practical Petrophysics* (2015), among others.

The source emits energy into the wellbore and the surrounding geologic formation. Within this disclosure, the source may emit any form of energy into both wellbore and the surrounding geologic formation, including energy comprising gamma rays, acoustic energy, an electromagnetic wave, or neutrons. Similarly, the short-spaced detector and the long-spaced detector may be any detector which senses some portion of the energy emitted by the source and generates a short-spaced signal and a long-spaced signal respectively.

The system disclosed here utilizes compensated instrument system 103 in data communication with processor 107 in order to monitor the compensation arising and applied as a result of receiving the long-spaced signal and the short-spaced signal and compensating the long range signal using the short range signal in order to provide a measurement for a physical property of the geologic formation. At FIG. 1, processor 107 receives a short-spaced signal from the short-spaced detector and a long-spaced signal from the long-spaced detector, and compensates the long-spaced signal using the short-spaced signal in order to generate compensated data, where the compensated data is indicative of the physical property of the geologic formation. During this process, processor 107 also generates standoff data. Here, standoff data means data comprising a correction applied to the long range signal in order to produce the compensated data, where the compensated data is indicative of the physical property of the geologic formation, and where the standoff data is determined using at least the short range signal. Processor 107 determines and maintains the standoff data as a time series comprising successive data point determinations made over a time interval, typically determined by the periodic frequency at which compensated instrument system 103 communicates with processor 107. Processor 107 selects a data point from the time series of standoff data and compares the data point to a moving average of the standoff data. Generally, the data point selected is the most recent data point within the standoff data, and the moving average is a time series model of a portion of the standoff data received prior to the data point and is determined by the processor based on previously generated standoff data.

Figure 2:
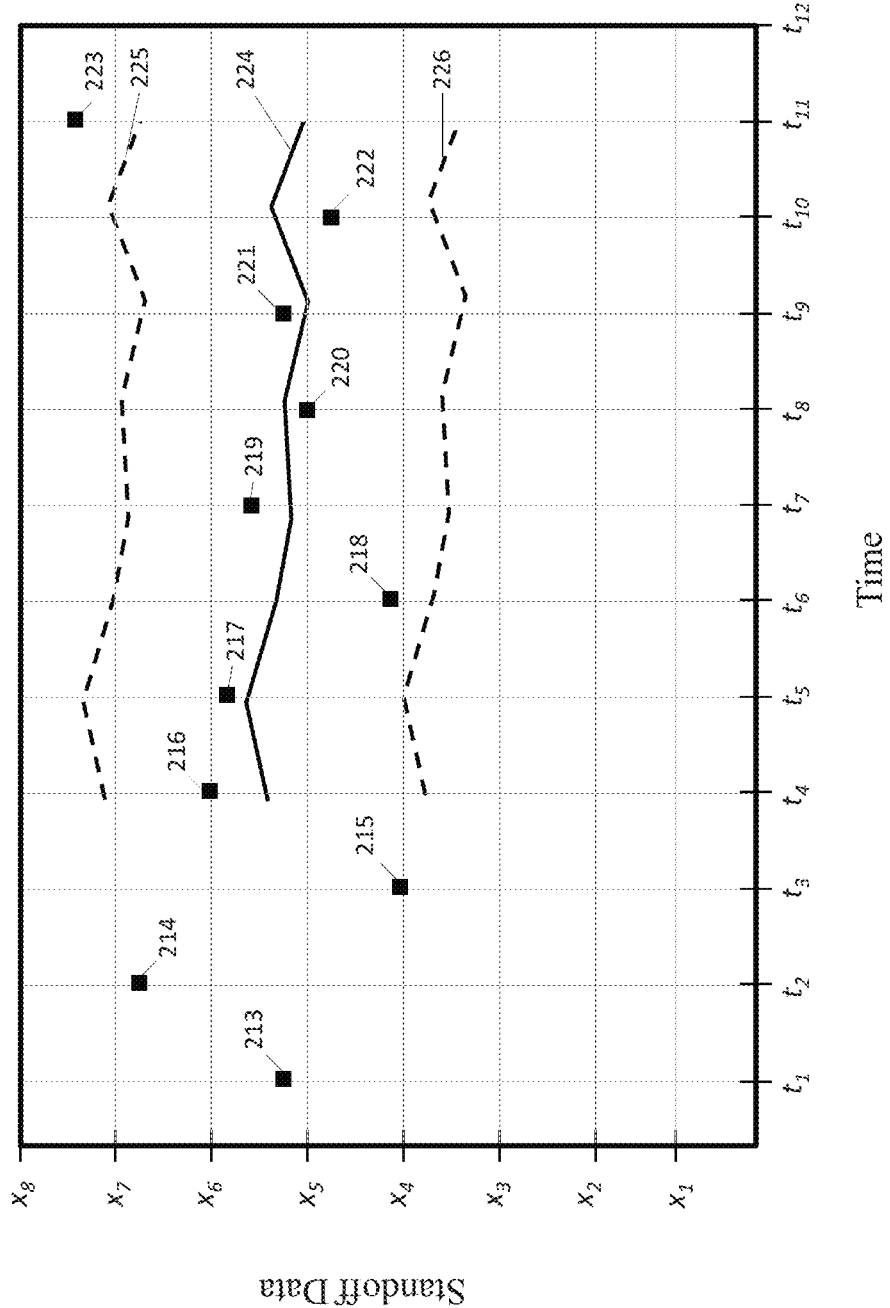
FIG. 2 illustrates an example of a standoff data and moving average.

As example, FIG. 2 illustrates a time series of standoff data represented as data points 213, 214, 215, 216, 217, 218, 219, 220, 221, 222, and 223 occurring at times $t_1$, $t_2$, $t_3$, $t_4$, $t_5$, $t_6$, $t_7$, $t_8$, $t_9$, $t_{10}$, and $t_{11}$ respectively. A three period moving average is illustrated at 224, where the moving average 224 is offset by one cycle from the 3 values averaged. For example, at $t_4$, moving average 224 has a value equal to the moving average of data points 213, 214, and 215 which occur at times $t_1$, $t_2$, and $t_3$ respectively. At FIG. 2, moving average 224 is bracketed by an upper threshold 225 and a lower threshold 226, where the thresholds are offset from moving average 224 by some threshold amount. Processor 107 selects a data point, for example data point 220 at to, and compares the data point to the moving average thresholds at $t_8$. If the data point is within the established thresholds, no warning signal is generated, and the data point is utilized to update the moving average for the next time period, here $t_9$. However, if the data point, such as data point 223 at $t_{11}$, falls outside either established threshold, processor 107 generates a warning signal and transmits the warning signal to display 110 via 111, to indicate that a well kick may be occurring. Display 110 is typically a 2-D screen, indicator light, or some other means by which the warning signal may be observed by an operator. The established thresholds may be input values supplied to processor 107 by an operator or may be determined by processor 107 based on a time series of standoff data received.

Processor 107 generally proceeds and evaluates chronologically as signals are received from short-spaced detector 105 and long-spaced detector 106. For example, processor 107 evaluates data point 216 against moving average thresholds 225 and 226 at time $t_4$, and if data point 216 is within the thresholds, updates moving average 224 to include data point 216 and proceeds to evaluate data point 217 when additional short-spaced signals and long-spaced signals are received. Processor 107 generally proceeds chronologically in this fashion and evaluates the remaining data points 217, 218, 219, 220, 221, 222, and 223 in chronological order as the long and short-spaced signals are received and additional standoff data is generated. Typically the data point originates at a first time, for example $t_9$, and the time interval over which the moving average is determined is based on data over a time interval having endpoints which precede to the first time, for example the time interval $t_6$ to $t_8$.

As stated, processor 107 determines and maintains the standoff data as a time series. The time series is a sequence of data points, comprising successive data points generated over a time interval as a result of processor 107 receiving periodic short-spaced signals from short-spaced detector 105 and long-spaced signals from long-spaced detector 106. Typically the time series is univariate and discontinuous. The moving average as used here is a time series forecasting using some portion of the standoff data received, where typically and as stated the time interval of the standoff data over which the moving average is determined precedes a time associated with a data point under evaluation. The time series forecasting may be any mathematical model which predicts future values based on previously observed values. For example, the mathematical model may be a simple moving average, autoregressive moving average, autoregressive integrated moving average, autoregressive fractionally integrated moving average, and others. See e.g., Yaffee, R. A., *Introduction to Time Series Analysis and Forecasting: with applications of SAS and SPSS* (2000), among others.

Figure 3:
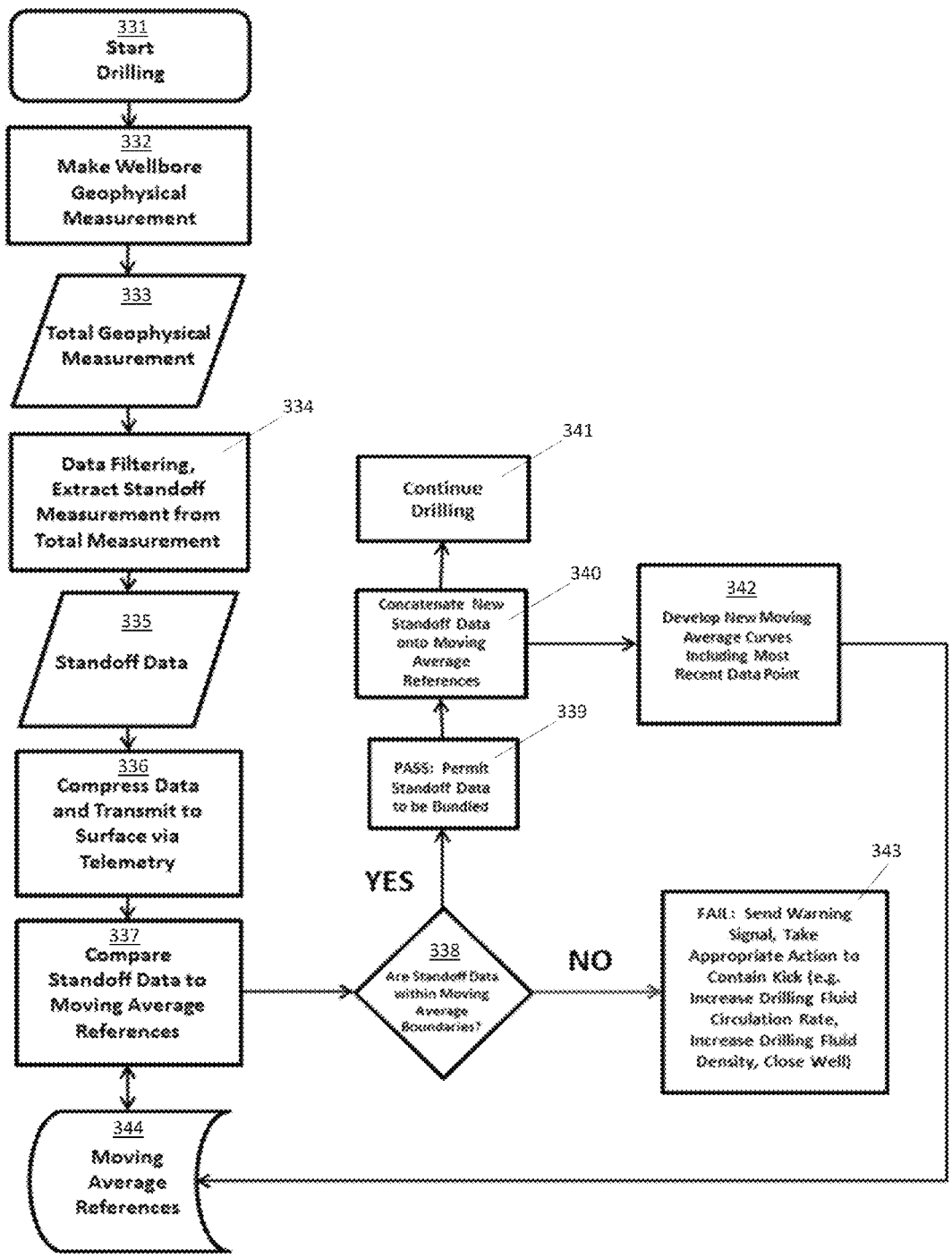
FIG. 3 illustrates an embodiment of the process.

An example of the process during a drilling operation is further illustrated at FIG. 3. The drilling process occurs and is ongoing at 331, and generates a wellbore within a geologic formation. A compensated instrument system such as 103 is disposed within the wellbore and comprises a source, a short-spaced detector, and a long-spaced detector. At 332, the source emits energy into the wellbore and the geologic formation, and the short-spaced detector and long-spaced detector detect the energy transmitted and generate a short-spaced signal and a long-spaced signal respectively. At 333, the compensated instrument system provides the short-spaced signal and the long-spaced signal. At 334 and 335, the processor receives the short-spaced signal and the long-spaced signal, compensates the long-spaced signal using the short-spaced signal in order to obtain a compensated measurement representing conditions within the geologic formation, and identifies a standoff data point. Steps 334 and 335 may be provided by a single surface-based processor, a single down hole processor, or some combination therein. If the portion of the processor which generates the standoff data point is down hole, the standoff data point is compressed and transmitted to the surface via telemetry.

At 337, the processor compares the standoff data point to the moving average thresholds. As discussed, the moving average is determined by the processor and based on time series forecasting using previously received standoff data points. At 338, the standoff data point is compared to the moving average thresholds. If the standoff data point is within the thresholds established, the standoff data point is bundled at 339, included within the time series of previously received standoff data points, and drilling continues at 341. Additionally, at 342 an updated moving average is determined by the processor, and at 344 the updated moving average is provided for comparison when another cycle commences at 342, and additional standoff data are generated. Alternately, if the standoff data point is outside the thresholds established, the processor generates a warning signal at 343 and communicates the warning signal to a display in data communication with the processor, which displays an indication of the warning signal in response.

In a particular embodiment, the system comprises a plurality of compensated instrument systems where each compensated instrument system provides a long-spaced signal and a short-spaced signal to a processor such as processor 107. In this embodiment, for each individual group of long and short-spaced signals received from each individual compensated instrument system, the processor compensates the long-spaced signal using the short-spaced signal and generates standoff data specific to the individual compensated instrument system, selects a data point comprising the standoff data, compares the data point to a moving average specific to the an individual compensated instrument system, and generates a warning signal when the data point exceeds the moving average by at least a threshold amount. In this embodiment, the processor may communicate the warning signal to the display based on the standoff data generated from a single compensated instrument system, or may apply a criteria, such as requiring at least 2 of 3 compensated instrument systems to generate standoff data outside the moving average thresholds before providing a kick detection signal to the display. The plurality of compensated instrument systems might comprise, for example, a first compensated instrument system providing resistivity measurement, a second compensated instrument system providing density measurement, and a third compensated instrument system providing acoustic measurement.

Thus, disclosed here is a kick detection system for use during a drilling operation where wellbore kick warnings are provided based on indications of standoff conditions in a compensated instrument system. The system provides a warning of a potential kick condition by comparing corrections utilized to provide a compensated measurement to the moving average of a time series of previously utilized corrections, in order to monitor whether conditions within the standoff region of the wellbore are unexpectedly changing. The moving average provides time forecasting of the previously utilized corrections, and a necessary correction which falls outside established thresholds around the moving average serves as an indication of rapidly changing conditions within the standoff region between the drilling mechanism and the borehole wall. In a particular embodiment, the system comprises a plurality of compensated instrument systems and the processor conducts a similar evaluation for each individual compensated instrument system, and applies a specific criterion before providing a warning signal, such as requiring at least 2 of 3 compensated instrument systems to generate standoff data outside the moving average thresholds.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A system for kick detection in a drilling operation comprising:

a compensated instrument system within a wellbore, where the compensated instrument system comprises a source, a short-spaced detector, and a long-spaced detector;

a processor in data communication with the compensated instrument system and receiving a short-spaced signal from the short-spaced detector and a long-spaced signal from the long-spaced detector, where the processor performs steps comprising, compensating the long-spaced signal using the short-spaced signal and generating a compensated data and a standoff data, where the standoff data is a time series;

selecting a data point comprising the standoff data, comparing the data point to a moving average, where the moving average is a time series forecasting of some portion of the standoff data received and, generating a warning signal when the data point exceeds the moving average by at least a threshold amount; and a display in data communication with the processor where the display receives the warning signal from the processor and displays an indication of the warning signal in response to receiving the warning signal.

2. The system of claim 1 where the data point originates at a first time and where the some portion of the standoff data received originates over a time interval comprising an initial time endpoint and a final time endpoint, and where final time endpoint of the time interval chronologically precedes the first time of the data point.

3. The system of claim 2 where the processor determines the moving average using the some portion of the standoff data received.

4. The system of claim 3 where when the data point does not exceed the moving average by at least the threshold amount, the processor includes the data point in the some portion of the standoff data received and updates the moving average.

5. The system of claim 4 where the processor receives an additional short-spaced signal from the short-spaced detector and an additional long-spaced signal from the long-spaced detector, and repeats the compensating the long-spaced signal using the short-spaced signal step, the selecting the data point comprising the standoff data step, the comparing the data point to the moving average step, and the generating the warning signal step using the additional short-spaced signal as the short-spaced signal and using the additional long-spaced signal as the long-spaced signal.

6. The system of claim 1 where the source emits energy to regions outside the wellbore, and where the long-spaced detector detects some portion of the energy emitted to the regions outside the wellbore.

7. The system of claim 6 where the energy comprises gamma rays, acoustic energy, an electromagnetic wave, or neutrons.

8. The system of claim 1 where the system comprises a plurality of compensated instrument systems within the wellbore, where each individual compensated instrument system in the plurality of compensated instrument systems comprises an individual source, an individual short-spaced detector, and an individual long-spaced detector, and where the processor is in data communication with the each individual compensated instrument system and receives an individual short-spaced signal from the individual short-spaced detector and an individual long-spaced signal from the individual long-spaced detector, and where for the each individual compensated instrument system, the processor performs the compensating the long-spaced signal using the short-spaced signal step, the selecting the data point comprising the standoff data step, the comparing the data point to the moving average step, and the generating the warning signal step using the individual short-spaced signal as the short-spaced signal and using the individual long-spaced as the long-spaced signal.

9. A system for kick detection in a drilling operation comprising:
a compensated instrument system within a wellbore, where the compensated instrument system comprises a source, a short-spaced detector, and a long-spaced detector, and where the source emits energy to regions outside the wellbore and the long-spaced detector detects some portion of the energy emitted to the regions outside the wellbore;
a processor in data communication with the compensated instrument system and receiving a short-spaced signal from the short-spaced detector and a long-spaced signal from the long-spaced detector, where the processor performs steps comprising,
compensating the long-spaced signal using the short-spaced signal and generating a compensated data and a standoff data, where the standoff data is a time series,
determining a moving average, where the moving average is a time series forecasting of some portion of the standoff data, where the some portion of the standoff data originates over a time interval comprising an initial time endpoint and a final time endpoint,
selecting a data point comprising the standoff data, where the data point originates at a first time, and where final time endpoint of the time interval chronologically precedes the first time,
comparing the data point to the moving average and,
generating a warning signal when the data point exceeds the moving average by at least a threshold amount and, when the data point does not exceed the moving average by at least the threshold amount, including the data point in the some portion of the standoff data received and updating the moving average; and
a display in data communication with the processor where the display receives the warning signal from the processor and displays an indication of the warning signal in response to receiving the warning signal.

10. The system of claim 9 where the processor receives an additional short-spaced signal from the short-spaced detector and an additional long-spaced signal from the long-spaced detector, and repeats the compensating the long-spaced signal using the short-spaced signal step, the determining the moving average step, the selecting the data point comprising the standoff data step, the comparing the data point to the moving average step, and the generating the warning signal step using the additional short-spaced signal as the short-spaced signal and using the additional long-spaced signal as the long-spaced signal.

11. The system of claim 10 where the energy comprises gamma rays, acoustic energy, an electromagnetic wave, or neutrons.

12. A system for kick detection in a drilling operation comprising:
a plurality of compensated instrument systems within the wellbore, where each individual compensated instrument system in the plurality of compensated instrument systems comprises an individual source, an individual short-spaced detector, and an individual long-spaced detector, where the individual source emits energy to regions outside the wellbore and the individual long-spaced detector detects some portion of the energy emitted to the regions outside the wellbore;
a processor in data communication with the each individual compensated instrument system in the plurality of compensated instrument systems and receiving from the each individual compensated instrument system an individual short-spaced signal from the individual short-spaced detector and an individual long-spaced signal from the individual long-spaced detector, where for the each individual compensated instrument system the processor performs steps comprising,
evaluating the each individual compensated instrument system by,
compensating the individual long-spaced signal using the individual short-spaced signal and generating a compensated data and a standoff data, where the standoff data is a time series, determining a moving average, where the moving average is a time series forecasting of some portion of the standoff data, where the some portion of the standoff data originates over a time interval comprising an initial time endpoint and a final time endpoint, selecting a data point comprising the standoff data, where the data point originates at a first time, and where final time endpoint of the time interval chronologically precedes the first time, comparing the data point to the moving average, generating a warning signal when the data point exceeds the moving average by at least a threshold amount and, generating a kick detection signal when the warning signal generates for at least two of the each individual compensated instrument systems in the plurality of compensated instrument systems; and a display in data communication with the processor where the display receives the kick detection signal from the processor and displays an indication of the kick detection signal in response to receiving the kick detection signal.

13. The system of claim 12 where when the kick detection signal is not generated, the processor includes the data point in the some portion of the standoff data received and updates the moving average.

14. The system of claim 13 where the energy comprises gamma rays, acoustic energy, an electromagnetic wave, or neutrons.

* * * * *